United States Patent
Maeda

(10) Patent No.: US 7,664,890 B2
(45) Date of Patent: Feb. 16, 2010

(54) SYSTEM CONTROL DEVICE

(75) Inventor: Taro Maeda, Osaka (JP)

(73) Assignee: Panasonic Corporation, Osaka (JP)

( * ) Notice: Subject to any disclaimer, the term of this patent is extended or adjusted under 35 U.S.C. 154(b) by 100 days.

(21) Appl. No.: 11/905,525

(22) Filed: Oct. 2, 2007

(65) Prior Publication Data

US 2008/0091865 A1 Apr. 17, 2008

(30) Foreign Application Priority Data

Oct. 12, 2006 (JP) ............................. 2006-279177

(51) Int. Cl.
*G06F 13/28* (2006.01)

(52) U.S. Cl. .............................. 710/23; 710/26; 710/30; 710/33

(58) Field of Classification Search ................... 710/22, 710/23, 26, 28, 33, 34
See application file for complete search history.

(56) References Cited

U.S. PATENT DOCUMENTS

| | | | | | |
|---|---|---|---|---|---|
| 4,502,117 | A | * | 2/1985 | Kihara | 710/28 |
| 4,989,113 | A | * | 1/1991 | Asal | 710/22 |
| 5,212,795 | A | * | 5/1993 | Hendry | 710/28 |
| 5,396,608 | A | * | 3/1995 | Garde | 711/200 |
| 5,465,332 | A | * | 11/1995 | Deloye et al. | 710/22 |
| 5,860,076 | A | * | 1/1999 | Greene et al. | 711/1 |
| 5,996,032 | A | * | 11/1999 | Baker | 710/62 |
| 6,691,179 | B2 | * | 2/2004 | Ku | 710/22 |
| 7,102,949 | B2 | | 9/2006 | Fujioka et al. | |
| 2007/0162644 | A1 | * | 7/2007 | Dabral et al. | 710/22 |

FOREIGN PATENT DOCUMENTS

JP 2005-327078 11/2005

* cited by examiner

*Primary Examiner*—Khanh Dang
(74) *Attorney, Agent, or Firm*—McDermott Will & Emery LLP

(57) ABSTRACT

A system control device comprises a system LSI section having a plurality of functional blocks, a system control microcomputer section for controlling the control register of each of the functional blocks, an address decoding section for decoding an access address to a predetermined byte in a control register which the system control microcomputer section attempts to access, and issuing an access control signal to the whole of a single control register including the predetermined byte, an access control section for changing the access control signal to the whole of the single control register to an access control signal to the predetermined bytes of the plurality of control registers included in the system LSI section, with respect to access to an address to the predetermined byte, and an access mode control register for indicating whether or not the changing by the access control section is to be performed.

11 Claims, 11 Drawing Sheets

SYSTEM CONTROL DEVICE

CROSS REFERENCE TO RELATED APPLICATIONS

This Non-provisional application claims priority under 35 U.S.C. §119(a) on Patent Application No. 2006-279177 filed in Japan on Oct. 12, 2006, the entire contents of which are hereby incorporated by reference.

BACKGROUND OF THE INVENTION

1. Field of the Invention

The present invention relates to a system control device which controls a system LSI having a plurality of functional blocks integrated on a single chip.

2. Description of the Related Art

System control devices generally comprise a system control microcomputer section and a system LSI section which has a plurality of functional blocks integrated on a single chip. Each functional block comprises a control register. Portions of an address space which can be accessed by the system control microcomputer section are assigned to these control registers. The system control microcomputer section controls the system LSI section having the functional blocks by accessing the control registers. For example, a system control device which accesses a plurality of control registers is disclosed in Japanese Unexamined Patent Application Publication No. 2005-327078.

FIG. 9 is a block diagram showing a whole configuration of a conventional system control device and a schematic diagram showing an operation of the system control device.

In FIG. 9, the system control device 900 comprises a system control microcomputer section 910, an address decoding section 911, and a system LSI section 920 which has four Direct Memory Access (DMA) controllers 921, 922, 923 and 924 which are integrated on a single chip. The four DMA controllers 921 to 924 are controlled by control registers 925, 926, 927 and 928 which are provided therein. The control registers 925 to 928 are accessed and controlled by the system control microcomputer section 910. For the access, the address decoding section 911 decodes an access address to a control register which the system control microcomputer section 910 attempts to access, into an address assigned to the control register.

Here, the system control device 900 uses the four DMA controllers 921 to 924 to transfer four pieces of image data PA, PB, PC and PD stored in different address areas 931, 932, 933 and 934 of a main memory 930 to four buffer areas 941, 942, 943 and 944 of a buffer 940. The image data PA to PD transferred to the buffer 940 are combined by an image combining block 950 to generate combined image data ABCD.

The image data PA to PD stored in the address areas 931 to 934 of the main memory 930 are updated by access from the outside of the system control device 900 a predetermined period of time after being transferred to the buffer 940 by the DMA controllers 921 to 924. After being updated, the updated image data PA to PD are transferred again to the buffer areas 941 to 944 of the buffer 940, respectively, using the DMA controllers 921 to 924. The image data PA to PD transferred to the buffer 940 are combined into combined image data ABCD.

Regarding hardware design for system control devices, when a plurality of DMA controllers having the same function are mounted on hardware, it is often that DMA controllers having the same design data are mounted in parallel, so that the control registers of the DMA controllers have a common address or bit position in the DMA controllers. Specifically, when an address of 1000 of the DMA controller 921 is assigned to the address of the control register 925 in the DMA controller 921, addresses of 1000 of the DMA controllers 922 to 924 are also assigned to the addresses of the control registers 926 to 928 in the DMA controllers 922 to 924, respectively.

FIG. 10 is a schematic diagram showing access to the control registers 925 to 928 in the conventional system control device 900.

In FIG. 10, the control registers 925 to 928 are provided in the DMA controllers 921 to 924, respectively. The control registers 925 to 928 each have 32 bits (four bytes). The Least Significant Bytes (LSBs) of the control registers 925 to 928 include startup bits which are used to start up the respective DMA controllers 921 to 924.

The system control microcomputer section 910 is a 32-bit microcomputer. A register access bus (host bus) via which the control registers 925 to 928 are accessed has a width of 32 bits.

In the system control device 900, when the image data PA is transferred to the buffer area 941 in the buffer 940, the system control microcomputer section 910 accesses the LSB of the control register 925. In this case, the address decoding section 911 receives an access address to the LSB of the control register 925 from the system control microcomputer section 910, and issues an access control signal for the whole control register 925. In other words, when the LSB of the control register 925 is accessed, the access control signal is issued for the whole 32-bit control register 925.

When the system control device 900 is used to transfer the four pieces of image data PA to PD from the main memory 930 to the buffer 940, four access control signals are sequentially issued to the respective control registers 925 to 928 to access the LSBs of the control registers 925 to 928, thereby starting up the DMA controllers 921 to 924, which in turn perform the transfer.

SUMMARY OF THE INVENTION

However, in the conventional system control device 900 of FIG. 9, when the four pieces of image data PA to PD are transferred, access control signals are sequentially issued to the respective 32-bit control registers 925 to 928. Therefore, the system control microcomputer section 910 needs to access the control registers 925 to 928 a total of four times. Therefore, if there are a number of control registers to be accessed, it disadvantageously takes a long time to access all the control registers.

Also, as shown in FIG. 11, in the system control microcomputer section 910, parameters, such as a transfer source address, a transfer destination address and the like, are set for each of the DMA controllers 921 to 924 (step S1100), and thereafter, a startup process and a startup completion confirming process may be performed for each of the DMA controllers 921 to 924 (step S1101), and the startup process and startup completion confirming process of step S1101 may be repeatedly performed until all data processes are completed in step S1102. When such an application is executed, the load of a software process of accessing the control registers of the DMA controllers 921 to 924 is significantly large in the system control microcomputer section 910.

The present invention has been achieved in view of the above-described problems. An object of the present invention is to provide a system control device in which a system control microcomputer section, when accessing control registers, can simultaneously access predetermined bytes of the control registers.

To achieve the object, according to the present invention, not only the whole of a single control register can be specified by performing register access once, but also a plurality of control registers can be simultaneously specified.

Specifically, a system control device according to a first embodiment of the present invention comprises a system LSI section having a plurality of functional blocks integrated on a single chip, each functional block having a control register, a system control microcomputer section for controlling the control register of each of the plurality of functional blocks, an address decoding section for decoding an access address to a predetermined byte in a control register which the system control microcomputer section attempts to access, and issuing an access control signal to the whole of a single control register including the predetermined byte, an access control section for changing the access control signal to the whole of the single control register to an access control signal to the predetermined bytes of the plurality of control registers included in the system LSI section, with respect to access to an address to the predetermined byte, and an access mode control register for indicating whether or not the changing of the access control signal by the access control section is to be performed.

A system control device according to a second embodiment of the present invention comprises a system LSI section having a plurality of functional blocks integrated on a single chip, each functional block having a control register, a system control microcomputer section for controlling the control register of each of the plurality of functional blocks, an address decoding section for decoding an access address which the system control microcomputer section attempts to access, and an access control section for selecting and issuing either an access control signal to the whole of a single control register included in the system LSI section or an access control signal to predetermined bytes of the plurality of control registers included in the system LSI section, based on the address decoded by the address decoding section.

A system control device according to a third embodiment of the present invention comprises a system LSI section having a plurality of functional blocks integrated on a single chip, each functional block having a control register, a system control microcomputer section for controlling the control register of each of the plurality of functional blocks, an address decoding section for decoding an access address which the system control microcomputer section attempts to access, and an access control section for selecting and issuing either an access control signal to the whole of a single control register included in the system LSI section or an access control signal to all bytes of a plurality of predetermined control registers of the plurality of control registers included in the system LSI section, based on the address decoded by the address decoding section.

In the system control devices of the first and second embodiments of the present invention, an access control signal to the whole of a predetermined control register in a system LSI section is changed to an access control signal to a predetermined byte of each of a plurality of control registers, or an access address for access to a predetermined byte of each of a plurality of control registers is additionally provided. Thereby, predetermined bytes of a plurality of control registers can be simultaneously accessed.

In the system control device of the third embodiment of the present invention, access addresses for access to all bytes of a plurality of control registers included in a system LSI section are additionally provided, thereby making it possible to simultaneously access all bytes of control registers in a plurality of functional blocks.

DETAILED DESCRIPTION OF THE PREFERRED EMBODIMENTS

Hereinafter, system control devices according to embodiments of the present invention will be described with reference to the accompanying drawings.

First Embodiment

Figure 1:
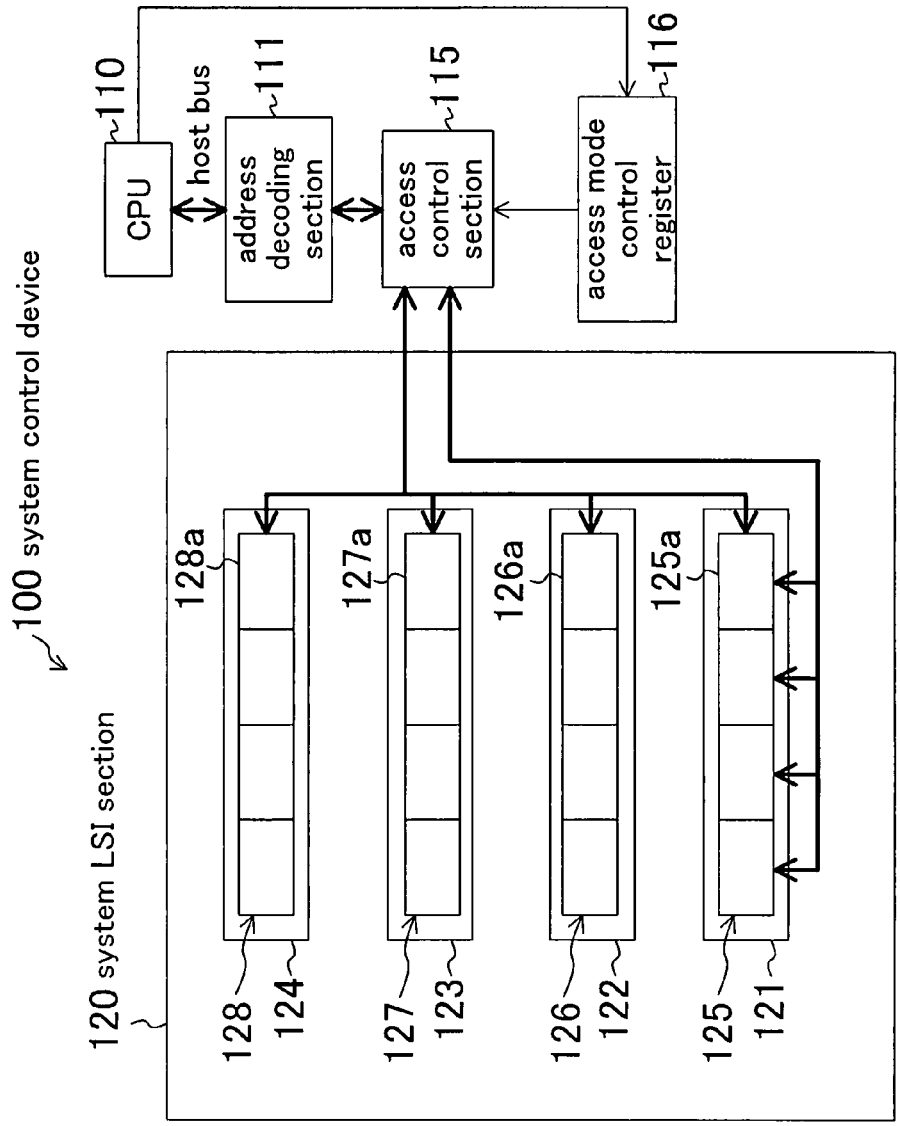
FIG. 1 is a block diagram showing a whole configuration of a system control device according to a first embodiment of the present invention and a schematic diagram showing access to control registers by the system control device.

FIG. 1 is a block diagram showing a whole configuration of a system control device according to a first embodiment of the present invention and a schematic diagram showing access to control registers by the system control device.

In FIG. 1, the system control device 100 comprises a CPU (system control microcomputer section) 110, an address decoding section 111, an access control section 115, an access mode control register 116, and a system LSI section 120 which has four DMA controllers (functional blocks) 121, 122, 123 and 124 integrated on a single chip. The four DMA controllers 121 to 124 comprise control registers 125, 126, 127 and 128, respectively, thereinside. Here, the control registers 125 to 128 each have 32 bits (4 bytes). LSBs 125a, 126a, 127a and 128a of the control registers 125 to 128 include startup bits which are used to start up the DMA controllers 121 to 124, respectively.

The CPU 110 is a 32-bit microcomputer. A register access bus (host bus) for accessing the control registers 125 to 128 has a width of 32 bits.

In the system control device 100, in order to start up all the four DMA controllers 121 to 124 in the system LSI section 120, the CPU 110 initially rewrites a value of the access mode control register 116 so that a register access mode is switched from an access mode in which the whole 32 bits of one control register are accessed to an access mode in which the LSBs 125a to 128a of the four control registers 125 to 128 are simultaneously accessed. Thereafter, the CPU 110 accesses the LSB 125a of the control register 125. Thereafter, the address decoding section 111 decodes an access address to the LSB 125a of the control register 125 which the CPU 110 attempts to access, and issues an access control signal to the whole 32 bits of the control register 125. The access control section 115 reads the value of the access mode control register 116, and changes the access control signal to the whole 32 bits of the control register 125 to an access control signal to the LSBs 125a to 128a of the four control registers 125 to 128 included in the system LSI section 120. By changing the access control signal, the CPU 110 simultaneously accesses the LSBs 125a to 128a to simultaneously start up the four DMA controllers 121 to 124. Here, the access mode control register 116 indicates whether or not the access control section 115 changes the access control signal to change combination of control registers. The access mode control register 116 is controlled by the CPU 110.

As described above, in this embodiment, the access control section 115 changes the access control signal to the whole control register 125 of the system LSI section 120 to the access control signal to the LSBs 125a to 128a of the four control registers 125 to 128 in the system LSI section 120. Therefore, all the four DMA controllers 121 to 124 in the system LSI section 120 can be started up by performing register access once, as compared to four times in the conventional art. Thereby, the reduction of the number of times of register access makes it possible to increase the efficiency of software and reduce the processing time of software.

Although a write process is performed by accessing the startup bits of the LSBs 125a to 128a of the control registers 125 to 128 in this embodiment, a read process can also be performed with respect to the LSBs 125a to 128a of the control registers 125 to 128. For example, the LSBs 125a to 128a may include status bits of the DMA controllers 121 to 124, respectively. The status bits may indicate whether the DMA controllers 121 to 124 are performing transfer, have completed transfer, or are waiting for startup or may indicate various errors. In this case, the statuses of the four DMA controllers 121 to 124 in the system LSI section 120 can be simultaneously read and confirmed.

Also, although it has been described in this embodiment that register access is performed with respect to control registers in a DMA controller, register access may be performed with respect to control registers in another functional block.

Second Embodiment

Figure 2:
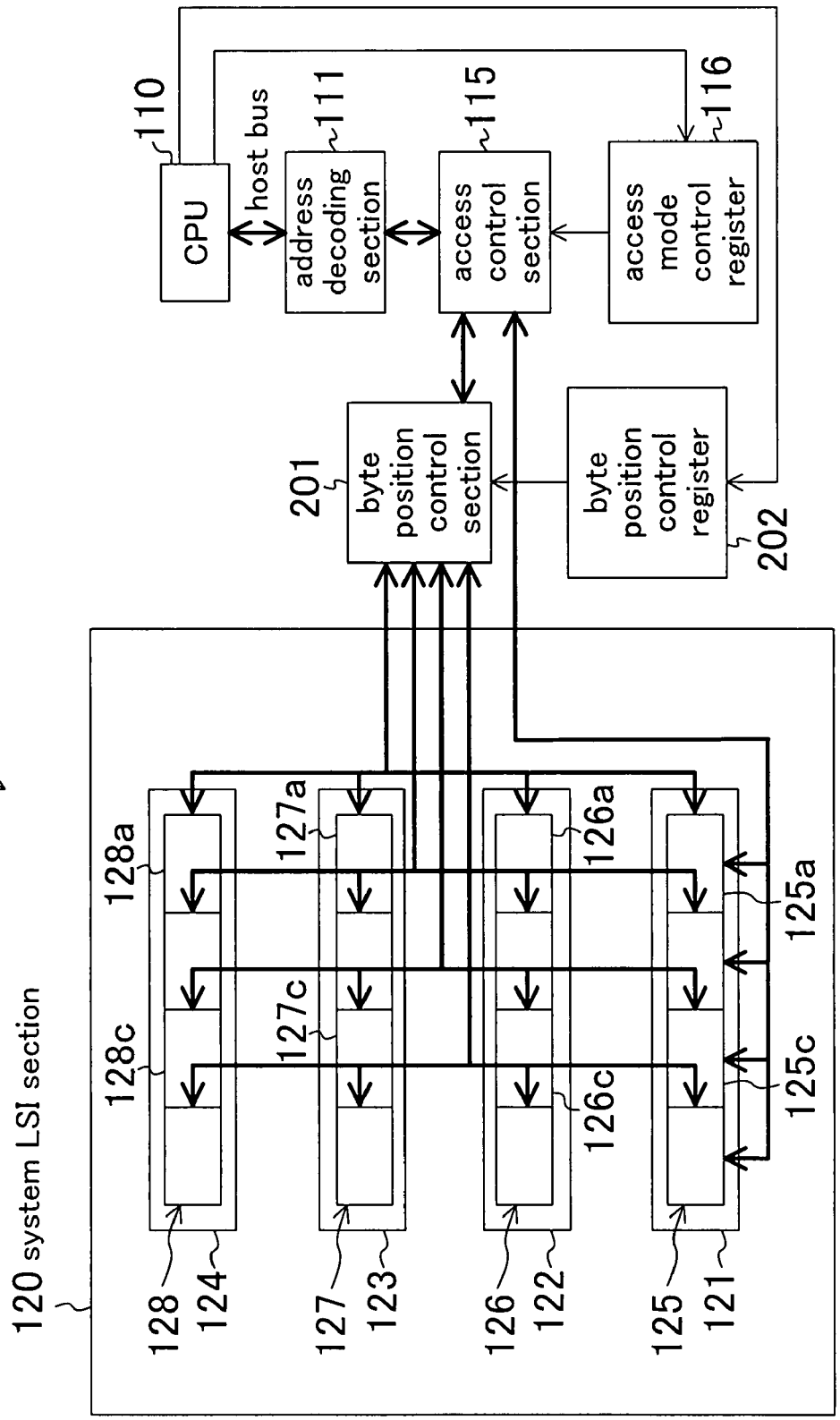
FIG. 2 is a block diagram showing a whole configuration of a system control device according to a second embodiment of the present invention and a schematic diagram showing access to control registers in the system control device.

FIG. 2 is a block diagram showing a whole configuration of a system control device according to a second embodiment of the present invention and a schematic diagram showing access to control registers in the system control device.

The system control device 200 of this embodiment is different from the system control device 100 of the first embodiment of FIG. 1 in that the system control device 200 comprises a byte position control section 201 for changing a position to which an access control signal is to be issued and a byte position control register 202 for storing information about the byte position changed by the byte position control section 201. The other parts are similar to those of the first embodiment and will not be described below.

The byte position control section 201 receives an access control signal whose register access mode has been changed by the access control section 115 and the byte position information of the byte position control register 202, and changes a byte position to which an access control signal is to be issued. For example, when the byte position control register 202 stores information indicating the third byte, the byte position control section 201 receives an access control signal to the LSBs 125a to 128a of the four control registers 125 to 128 in the system LSI section 120 and changes the access control signal into an access control signal which is to be issued to the byte position to third bytes 125c to 128c of the control registers 125 to 128. Here, the byte position information stored in the byte position control register 202 is accessed and controlled by the CPU 110.

Figure 3:
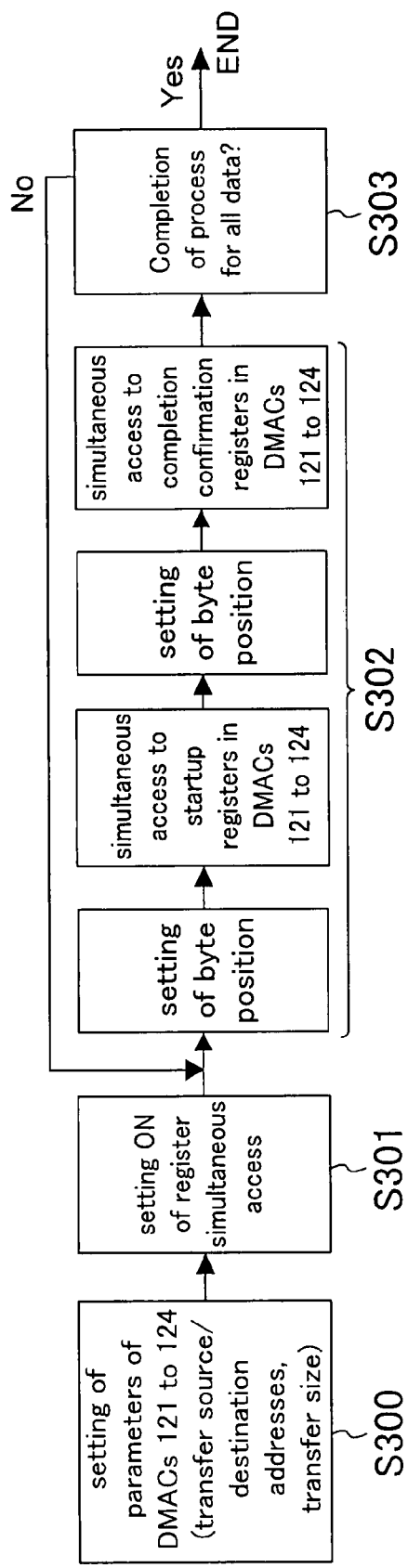
FIG. 3 is a flowchart showing a rough process flow of access to control registers by the system control device.

In the system control device 200, for example, the LSBs 125a to 128a of the control registers 125 to 128 may each include a startup bit and the third bytes 125c to 128c of the control registers 125 to 128 may each include a status bit. In this case, as shown in FIG. 3, initially, the CPU 110 sets parameters, such as transfer source addresses, transfer destination addresses and the like of the four DMA controllers 121 to 124 in the system LSI section 120 (step S300), and thereafter, the access mode control register 116 is set so that the access control section 115 changes the register access mode (step S301). Thereafter, the byte position information of the byte position control register 202 is set to be the first byte, and the LSBs 125a to 128a of the control registers 125 to 128 are simultaneously accessed to perform a startup process (write process) with respect to the four DMA controllers 121 to 124 simultaneously, i.e., in parallel (step S302). Thereafter, the byte position information of the byte position control register 202 is set to be the third byte, and the third bytes 125c to 128c of the control registers 125 to 128 are simultaneously accessed to perform a startup completion confirming process (read process) with respect to the four DMA controllers 121 to 124 simultaneously, i.e., in parallel (step S302).

Figure 11:
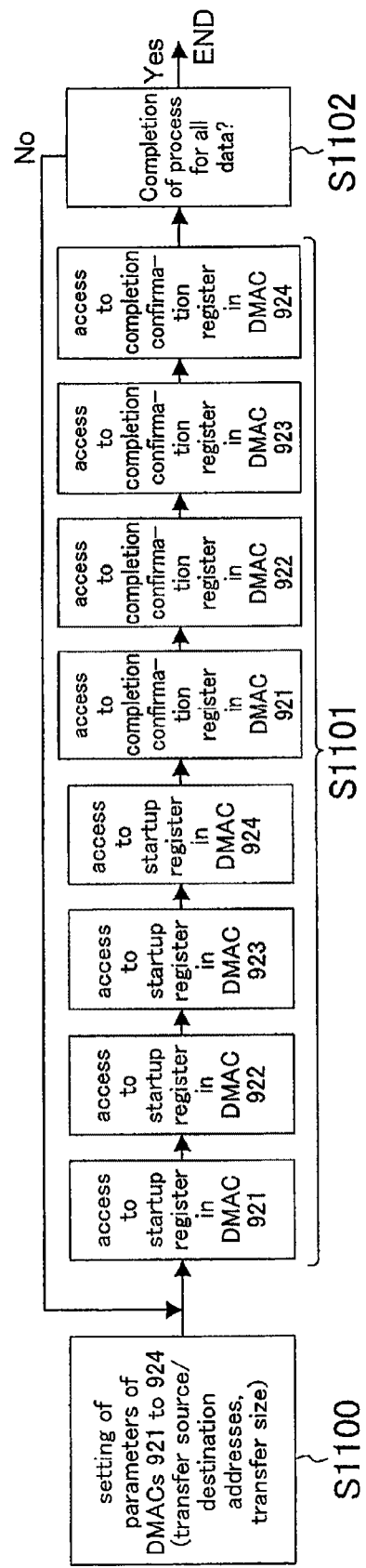
FIG. 11 is a flowchart showing a rough process flow of access to control registers by a conventional system control device.

As described above, in this embodiment, even when bytes which are frequently accessed extend over the four control registers 125 to 128 in the system LSI section 120, and none of the bytes are present in the LSBs 125a to 128a of the control registers 125 to 128, the third bytes 125c to 128c of the control registers 125 to 128 can be simultaneously accessed. Therefore, the number of times of register access can be further reduced, so that the processing time of software can be further reduced, as compared to register access in the conventional system control device 900 of FIG. 11. In addition, the degree of freedom and efficiency of software design can be improved.

Third Embodiment

Figure 4:
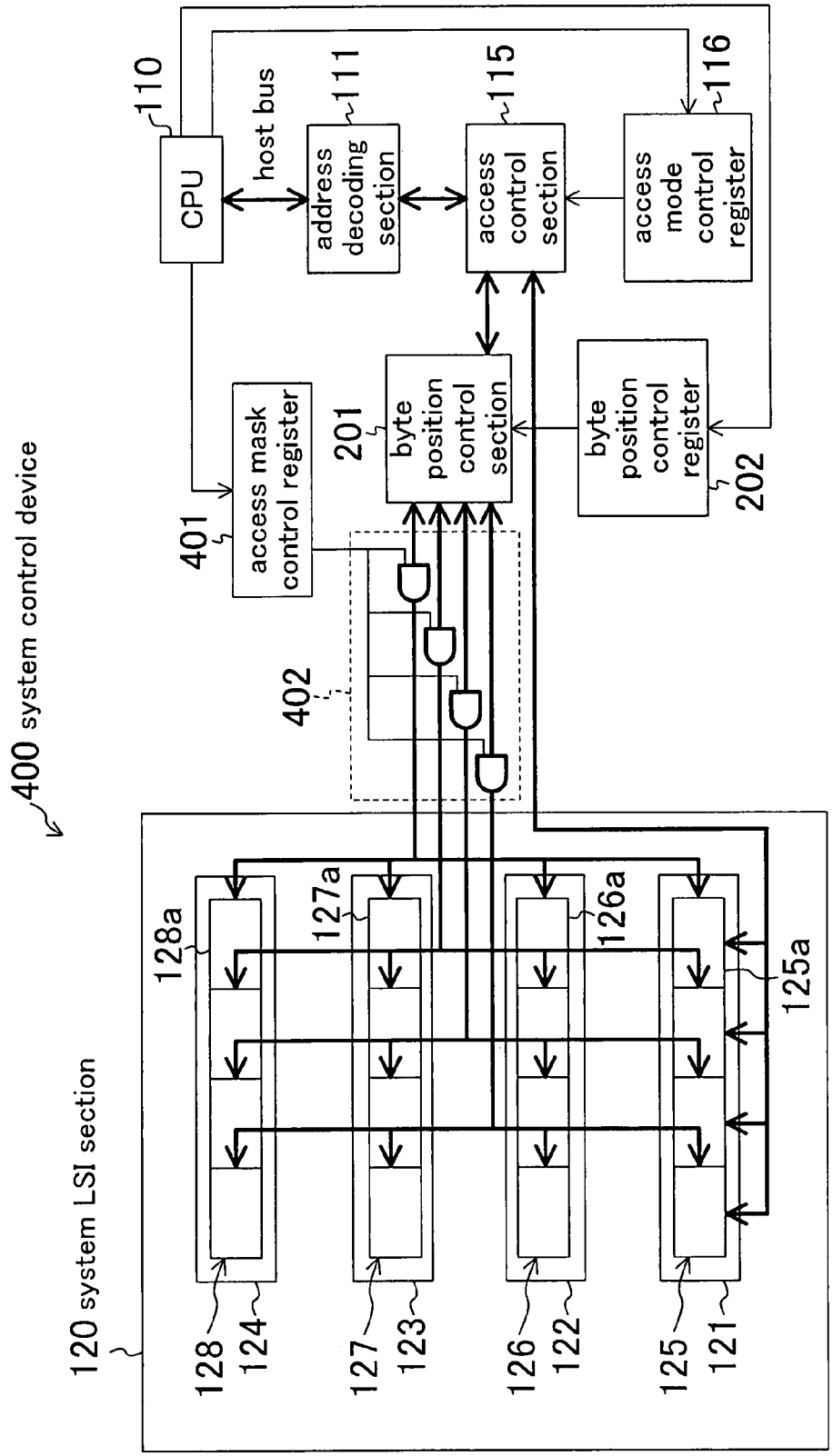
FIG. 4 is a block diagram showing a whole configuration of a system control device according to a third embodiment of the present invention and a schematic diagram showing access to control registers in the system control device.

FIG. 4 is a block diagram showing a whole configuration of a system control device according to a third embodiment of the present invention and a schematic diagram showing access to control registers in the system control device.

The system control device 400 of this embodiment is different from the system control device 200 of the second embodiment of FIG. 2 in that the system control device 400 comprises an access mask control register (access mask control register section) 401 for masking an access control signal to the control registers 125 to 128 in units of bits, and an AND circuit group (access mask control register section) 402 including 128 AND circuits connected thereto. The other parts are similar to those of the second embodiment and will not be described below. Note that, in FIG. 4, only four AND circuits are shown in the AND circuit group 402.

The access mask control register 401 performs a mask control in units of bits with respect to an access control signal issued by the byte position control section 201 so that bits of the control registers 125 to 128 whose current values are not desired to be changed or bits which must not be accessed due to a limitation on hardware are not affected by the access control signal. The AND circuit group 402 is used for the mask control. The AND circuit group 402 includes 128 AND circuits corresponding to a total of 4×32 bits of the four control registers 125 to 128. The bits which are specified to be subjected to the mask control by the access mask control register 401 are accessed and controlled by the CPU 110.

As described above, in this embodiment, when an access control signal is issued even to a control register or a byte which includes a bit whose current value is not desired to be changed, a mask control is performed with respect to the bit which is not desired to be accessed, thereby making it unnecessary to read, modify, or write the bit. Therefore, only a bit(s) which is desired to be accessed can be subjected to a control using an access control signal, resulting in a further increase in efficiency of software.

Fourth Embodiment

Figure 5:
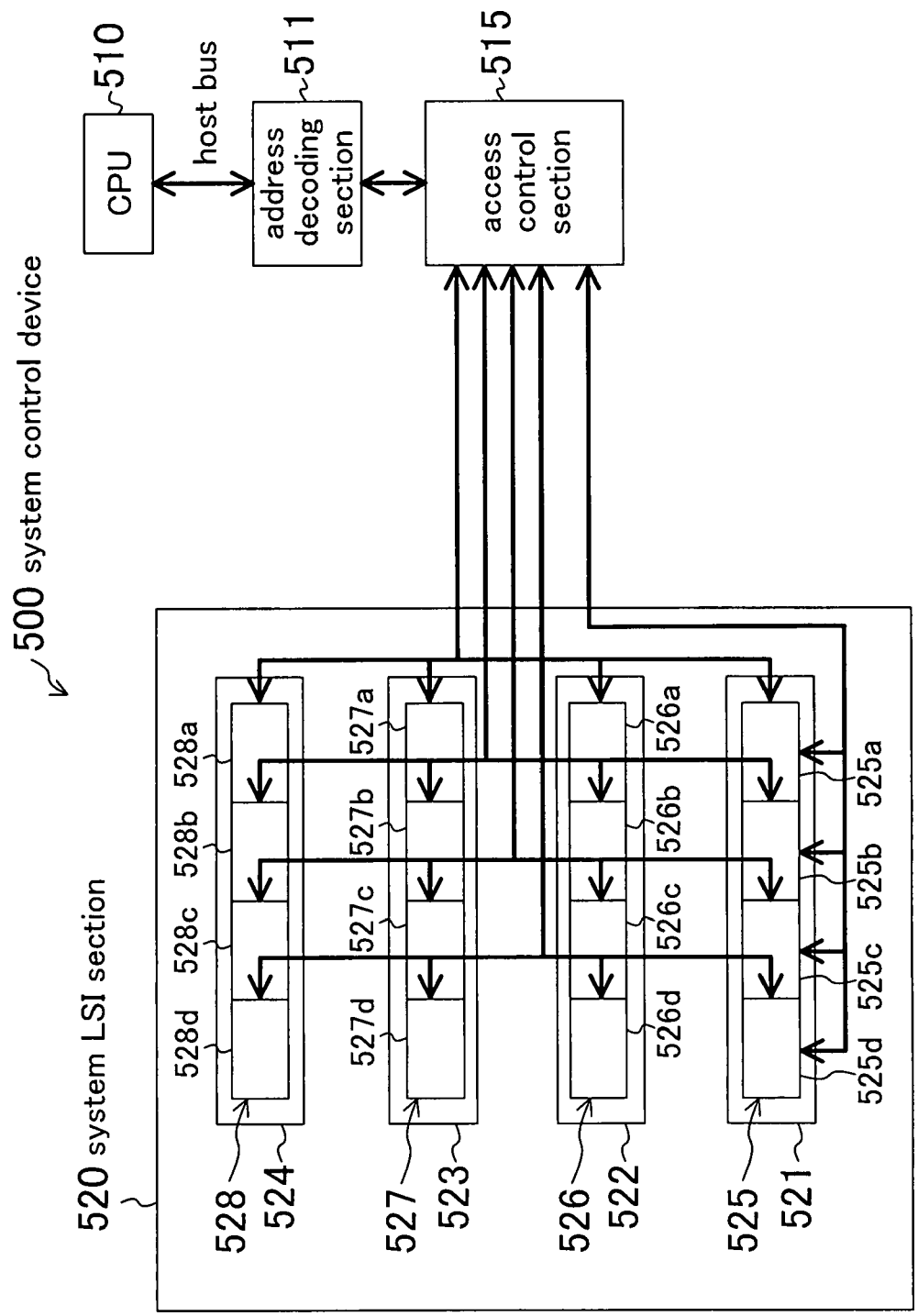
FIG. 5 is a block diagram showing a whole configuration of a system control device according to a fourth embodiment of the present invention and a schematic diagram showing access to control registers in the system control device.

FIG. 5 is a block diagram showing a whole configuration of a system control device according to a fourth embodiment of the present invention and a schematic diagram showing access to control registers in the system control device.

In FIG. 5, the system control device 500 comprises a CPU (system control microcomputer section) 510, an address decoding section 511, an access control section 515, and a system LSI section 520 which has four DMA controllers (functional blocks) 521, 522, 523 and 524 integrated on a single chip. The four DMA controllers 521 to 524 comprise control registers 525, 526, 527 and 528, respectively, thereinside.

In the system control device 500, in addition to addresses for access to the control registers 525 to 528, addresses for access to predetermined bytes of the control registers 525 to 528 are provided. Specifically, addresses for simultaneous access to the LSBs 525*a*, 526*a*, 527*a* and 528*a* of the control registers 525 to 528, addresses for simultaneous access to the second bytes 525*b*, 526*b*, 527*b* and 528*b* of the control registers 525 to 528, addresses for simultaneous access to the third bytes 525*c*, 526*c*, 527*c* and 528*c* of the control registers 525 to 528, and addresses for simultaneous access to the fourth bytes 525*d*, 526*d*, 527*d* and 528*d* of the control registers 525 to 528 are additionally provided.

When the LSBs 525*a* to 528*a* of the control registers 525 to 528 are simultaneously accessed, the addresses for simultaneous access to the LSBs 525*a* to 528*a* are accessed from the CPU 510. Thereafter, the address decoding section 511 decodes the access addresses to the LSBs 525*a* to 528*a* which the CPU 510 attempts to access. Thereafter, the access control section 515 selects and issues an access control signal to the LSBs 525*a* to 528*a* of the control registers 525 to 528 based on the addresses decoded by the address decoding section 511 to simultaneously access the LSBs 525*a* to 528*a*.

Also, when the whole control register 525 is accessed, the addresses for access to the whole control register 525 are accessed from the CPU 510, the access addresses are decoded by the address decoding section 511, and based on the decoded addresses, the access control section 515 selects and issues an access control signal to the whole control register 525.

As described above, in this embodiment, addresses for simultaneous access to predetermined bytes of the control registers 525 to 528 are additionally provided, and the addresses are accessed from the CPU 510, thereby making it possible to simultaneously access predetermined bytes of the control registers 525 to 528 by performing register access once. Therefore, the reduction of the number of times of register access can make it possible to increase the efficiency of software.

Also, as is different from the above-described first and second embodiments, it is not necessary to provide the access mode control register 116, the byte position control section 201, or the byte position control register 202, resulting in a reduction in hardware scale.

Fifth Embodiment

Figure 6:
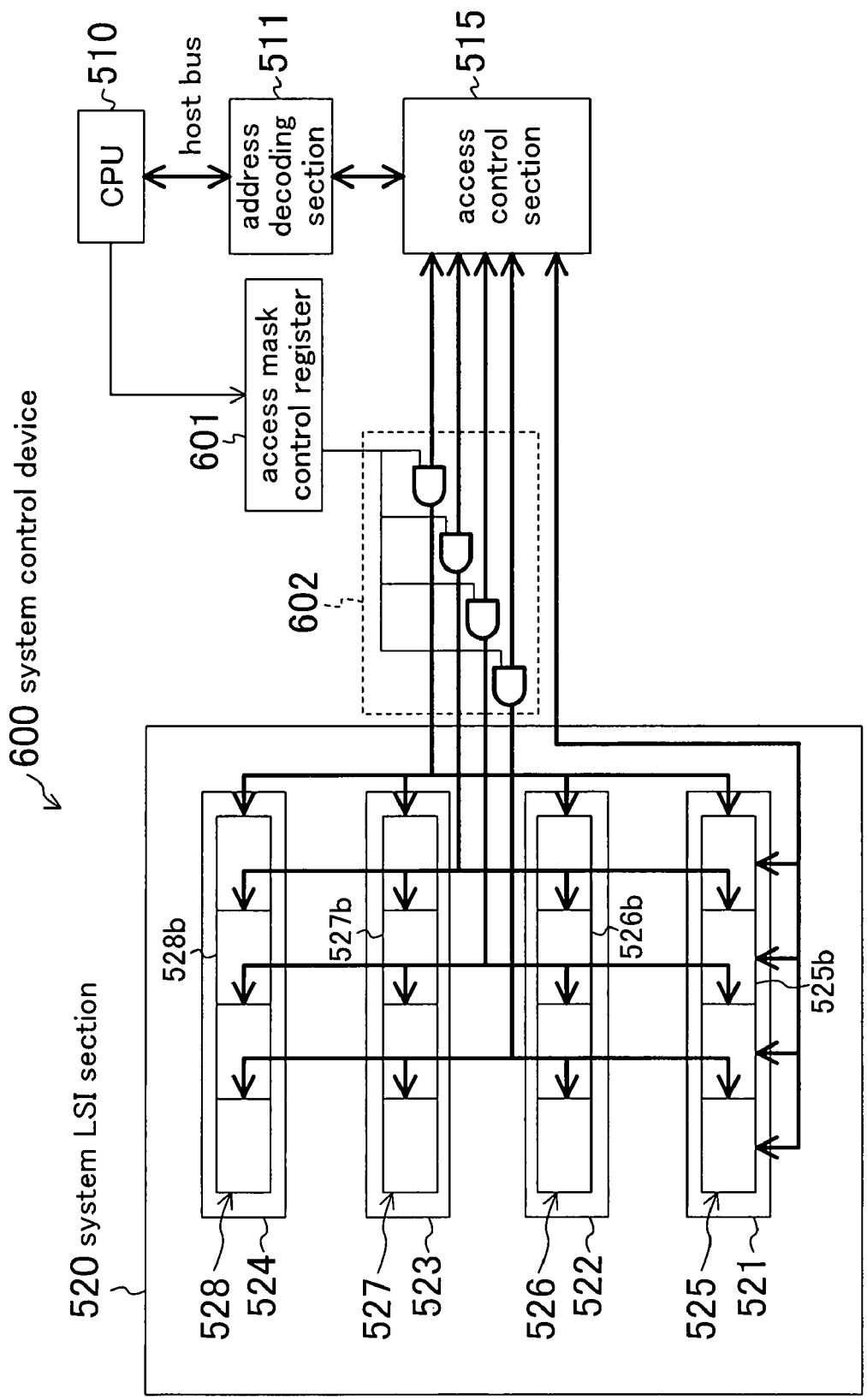
FIG. 6 is a block diagram showing a whole configuration of a system control device according to a fifth embodiment of the present invention and a schematic diagram showing access to control registers in the system control device.

FIG. 6 is a block diagram showing a whole configuration of a system control device according to a fifth embodiment of the present invention and a schematic diagram showing access to control registers in the system control device.

The system control device 600 of this embodiment is different from the system control device 500 of the fourth embodiment of FIG. 5 in that the system control device 600 comprises an access mask control register (access mask control register section) 601 which masks an access control signal to the control registers 525 to 528 in units of bits, and an AND circuit group (access mask control register section) 602 which comprises 128 AND circuits connected thereto. The other parts are similar to those of the fourth embodiment and will not be described below. Note that, in FIG. 6, only four AND circuits are shown in the AND circuit group 602.

The access mask control register 601 performs a mask control in units of bits with respect to an access control signal issued by the access control section 515 so that bits of the control registers 525 to 528 whose current values are not desired to be changed or bits which must not be accessed due to a limitation on hardware are not affected by the access control signal. The AND circuit group 602 is used for the mask control. The AND circuit group 602 includes 128 AND circuits corresponding to a total of 4×32 bits of the four control registers 525 to 528. The bits which are specified to be subjected to the mask control by the access mask control register 601 are accessed and controlled by the CPU 510.

As described above, in this embodiment, when an access control signal is issued even to a control register or a byte which includes a bit whose current value is not desired to be changed, a mask control is performed with respect to the bit which is not desired to be accessed, thereby making it unnecessary to read, modify, or write the bit. Therefore, only a bit(s) which is desired to be accessed can be subjected to a control using an access control signal, resulting in a further increase in efficiency of software.

Sixth Embodiment

Figure 7:
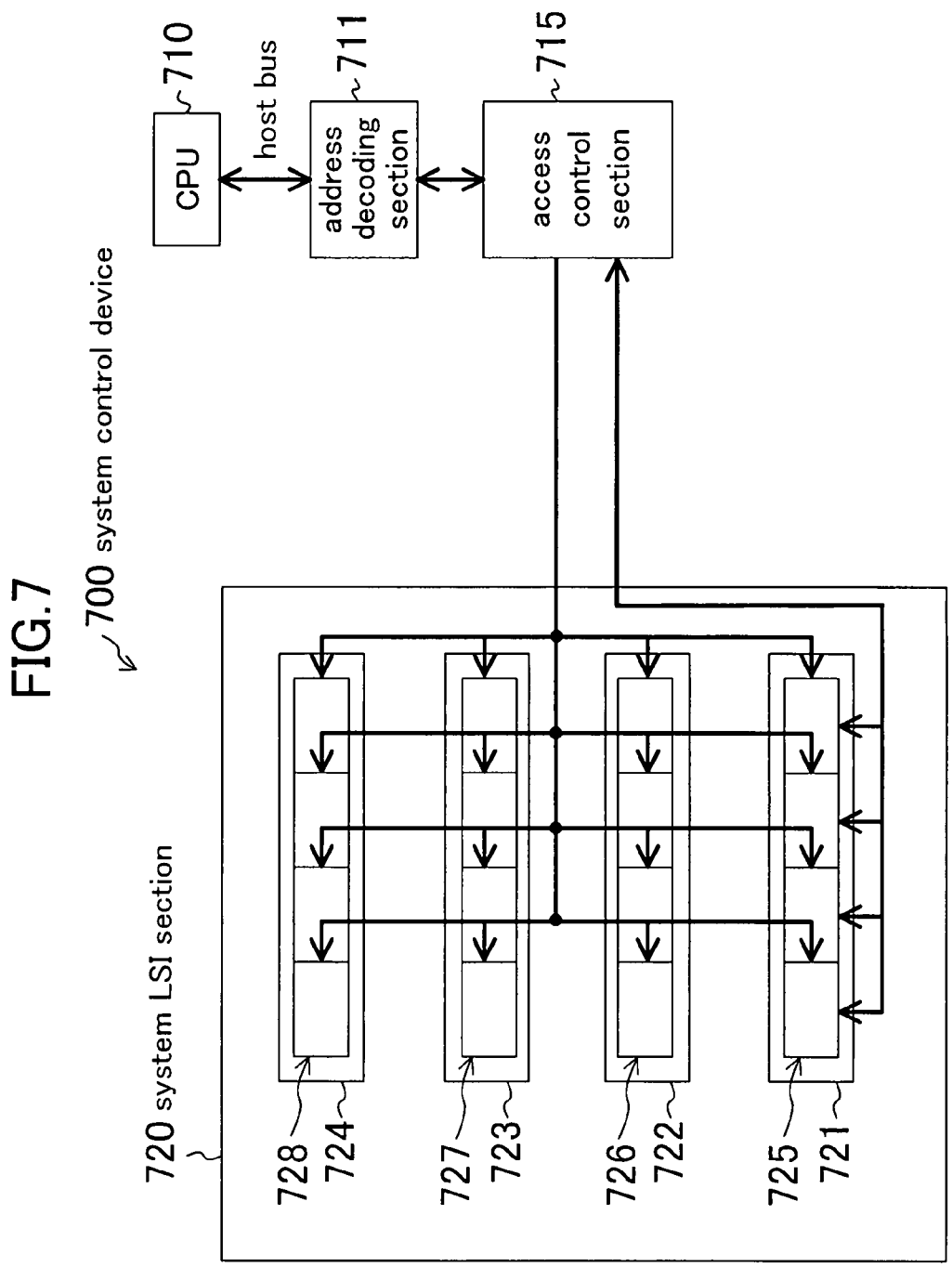
FIG. 7 is a block diagram showing a whole configuration of a system control device according to a sixth embodiment of the present invention and a schematic diagram showing access to control registers in the system control device.

FIG. 7 is a block diagram showing a whole configuration of a system control device according to a sixth embodiment of the present invention and a schematic diagram showing access to control registers in the system control device.

In FIG. 7, the system control device 700 comprises a CPU (system control microcomputer section) 710, an address decoding section 711, an access control section 715, and a system LSI section 720 which has four DMA controllers (functional blocks) 721, 722, 723 and 724 integrated on a single chip. The four DMA controllers 721 to 724 comprise control registers 725, 726, 727 and 728, respectively.

In the system control device 700, in addition to addresses for access to the control registers 725 to 728, addresses for access to all bits of a plurality of predetermined control registers of all control registers provided in the system LSI section 720 are additionally provided. Specifically, addresses for access to all bits of the four control registers 725 to 728 of the system LSI section 720 or addresses for access to all bits of the two control registers 725 and 726 in the system LSI section 720 are additionally provided.

When all the bits of the four control registers 725 to 728 provided in the system LSI section 720 are simultaneously accessed, the addresses for access to all the bits of the four control registers 725 to 728 are accessed from the CPU 710. Thereafter, the address decoding section 711 decodes the access addresses to all the bits of the four control registers 725 to 728 which the CPU 710 attempts to access. Thereafter, the access control section 715 selects and issues an access control signal to all the bits of the four control registers 725 to 728 based on the addresses decoded by the address decoding section 711 to access all the bits of the four control registers 725 to 728 simultaneously.

Here, access to all bits of a plurality of predetermined control registers of all the control registers provided in the system LSI section 720 is performed only for write processes, and a value which is written into a bit is common to bits in each control register to be accessed. The common value is written in units of control registers, so that a value output via a host bus from the CPU 710 has 32 bits. Therefore, bits exceeding the bit width of the host bus can be simultaneously accessed to set new values thereinto.

Also, when the whole control register 728 is accessed, addresses for simultaneous access to the whole control register 728 are accessed from the CPU 710, the access addresses are decoded by the address decoding section 711, and based on the decoded addresses, the access control section 715 selects and issues an access control signal to the whole control register 728.

As described above, in this embodiment, addresses for simultaneous access to all bits of a plurality of predetermined control registers of all the control registers 725 to 728 provided in the system LSI section 720 are additionally provided and are accessed from the CPU 710, thereby making it possible to access control registers exceeding the bit width of the host bus of the CPU 710 by performing register access once. Therefore, the reduction of the number of times of register access makes it possible to increase the efficiency of a software process. Thereby, for example, when all interrupt processes remaining after the previous operation are cleared before starting up a plurality of DMA controllers provided in a system LSI section, when a plurality of DMA controllers having a common DMA transfer mode or an operation mode (addressing, a factor to initiate startup, etc.) is started up, or the like, a common value can be set in units of registers by performing register access once.

Although addresses for access to all bits of the four control registers 725 to 728 or addresses for access to all bits of the two control registers 725 and 726 are provided in this embodiment, the number of control registers to be accessed is not particularly limited.

Seventh Embodiment

Figure 8:
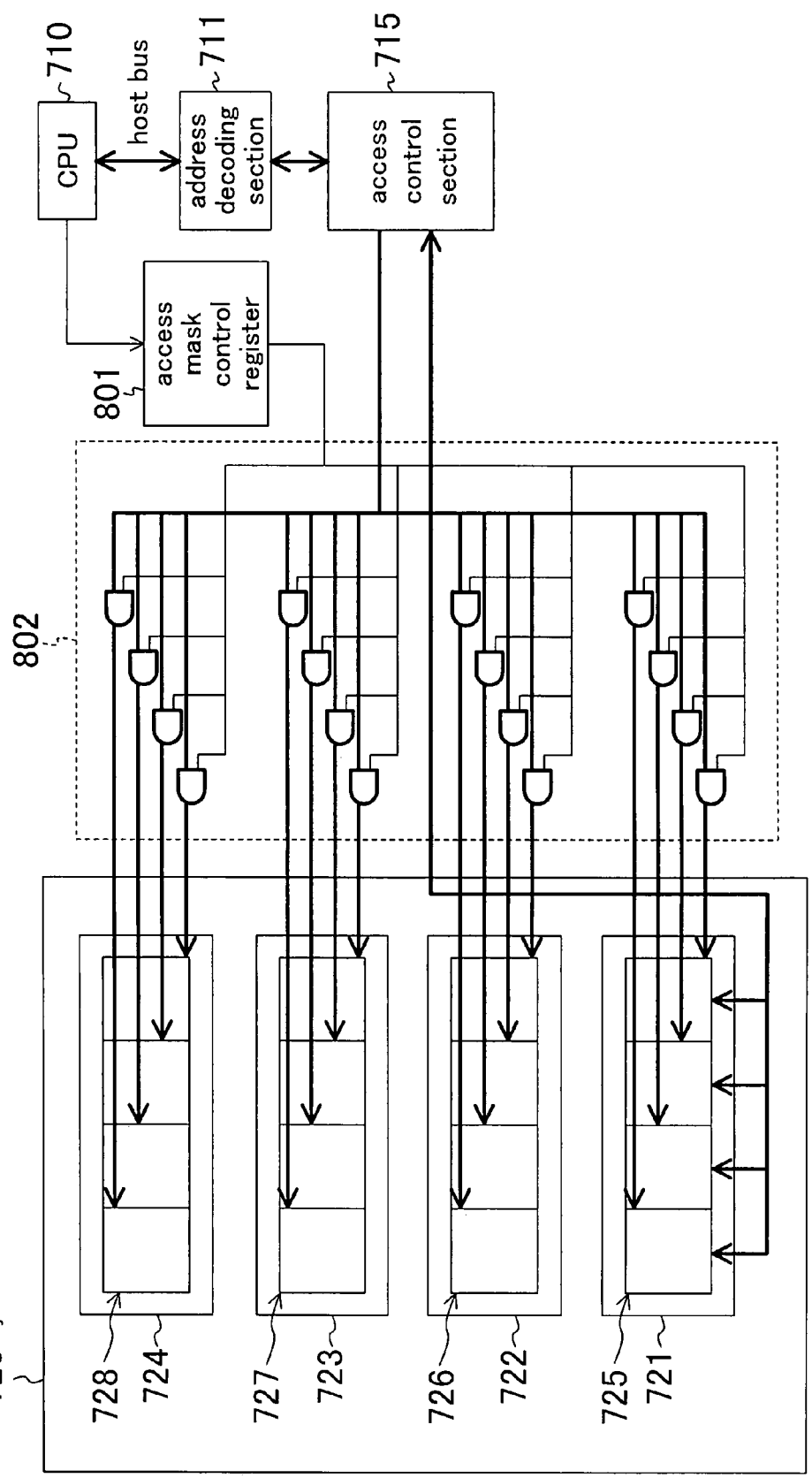
FIG. 8 is a block diagram showing a whole configuration of a system control device according to a seventh embodiment of the present invention and a schematic diagram showing access to control registers in the system control device.
Figure 9:
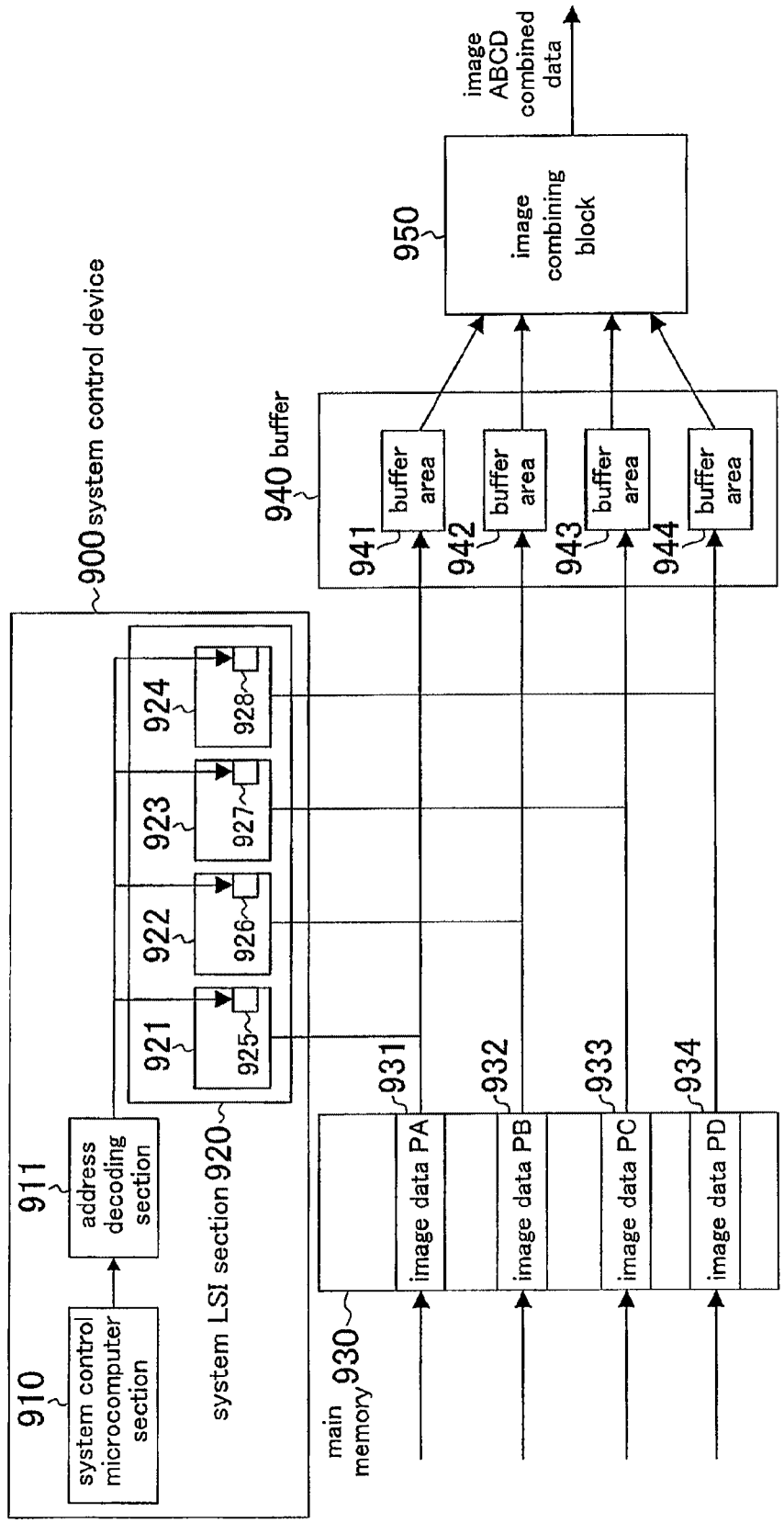
FIG. 9 is a block diagram showing a whole configuration of a conventional system control device and a schematic diagram showing an operation of the system control device.
Figure 10:
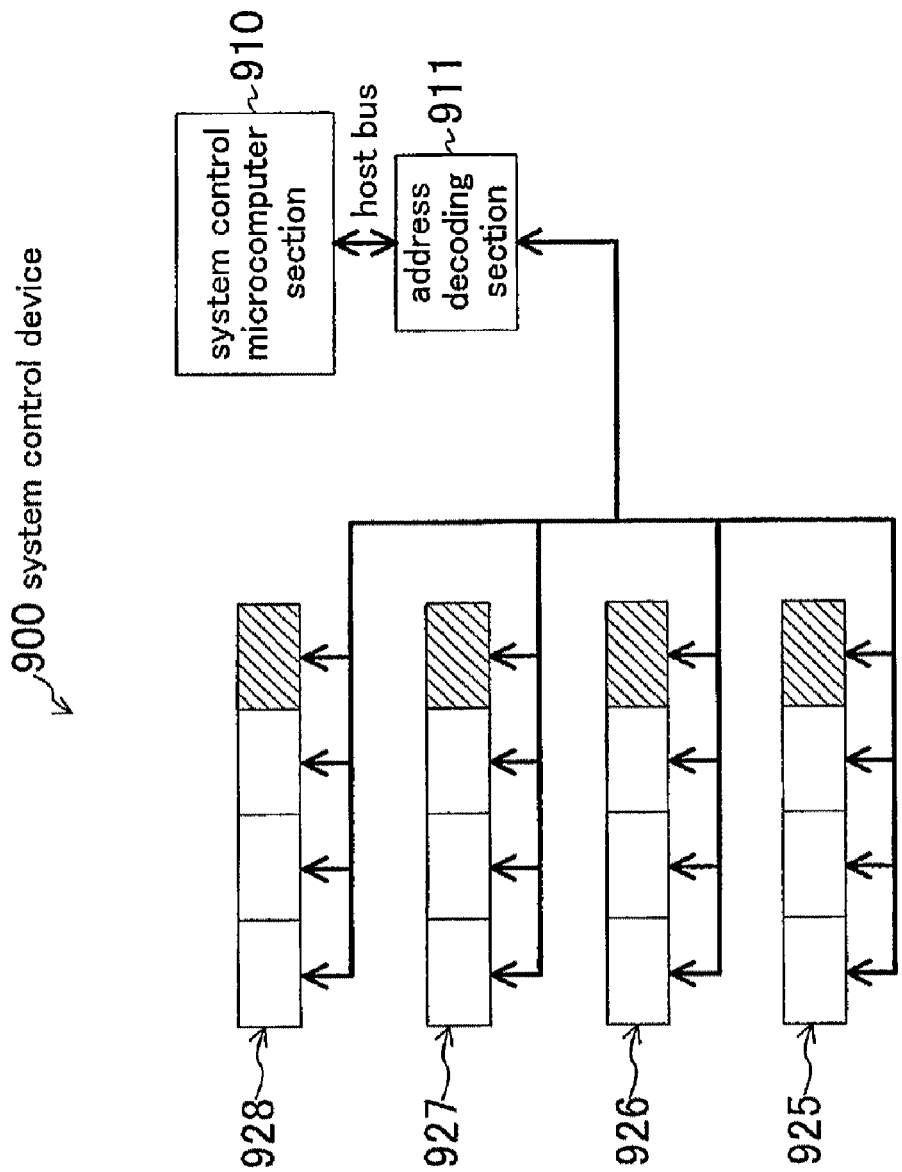
FIG. 10 is a schematic diagram showing access to control registers in a conventional system control device.

FIG. 8 is a block diagram showing a whole configuration of a system control device according to a seventh embodiment of the present invention and a schematic diagram showing access to control registers in the system control device.

The system control device 800 of this embodiment is different from the system control device 700 of the sixth embodiment of FIG. 7 in that the system control device 800 comprises an access mask control register (access mask control register section) 801 which masks an access control signal to the control registers 725 to 728 in units of bits, and an AND circuit group (access mask control register section) 802 which comprises 128 AND circuits connected thereto. The other parts are similar to those of the sixth embodiment and will not be described below. Note that, in FIG. 8, only 16 AND circuits are shown in the AND circuit group 802.

The access mask control register 801 performs a mask control in units of bits with respect to an access control signal issued by the access control section 715 so that bits of the control registers 725 to 728 whose current values are not desired to be changed or bits which must not be accessed due to a limitation on hardware are not affected by the access control signal. The AND circuit group 802 is used for the mask control. The AND circuit group 802 includes 128 AND circuits corresponding to a total of 4×32 bits of the four control registers 725 to 728. The bits which are specified to be subjected to the mask control by the access mask control register 801 are accessed and controlled by the CPU 710.

As described above, in this embodiment, a mask control is performed with respect to the bit which is not desired to be accessed, thereby making it unnecessary to read, modify, or write the bit. Therefore, only a bit(s) which is desired to be accessed can be subjected to a control using an access control signal, resulting in a further increase in efficiency of software.

Also, when a transfer destination address or a transfer source address is set for a plurality of DMA controllers, a memory area which is used by each DMA controller is divided, and only set values of lower addresses can be simultaneously changed without changing set values of upper addresses which are first once set. Therefore, it is possible to further reduce the software process.

Further, at the stage of hardware design, a position or a polarity of a control bit which is frequently accessed may be implemented as appropriate with respect to a relationship between a mask signal for registers which are simultaneously accessed and set data for simultaneous access, thereby making it possible to expect a significant reduction in software process. For example, when a plurality of DMA controllers are implemented on hardware, the DMA controllers are designed so that some of the DMA controllers having control registers which have startup bits located at the same position and have the same polarity (e.g., control registers which are started up when the startup bits are "0") can be simultaneously accessed, thereby making it possible to effectively reflect a change in set value by performing register access once on a plurality of control registers. Also, by assigning a bit position "0" to a startup-related register and bit positions "16 to 31" to status-related registers, control registers in different functional blocks (e.g., a startup register in a DMA controller and a startup register in an AV decoder) can be easily simultaneously controlled, thereby making it possible to expect a further reduction in the software process.

As described above, according to the present invention, when access to control registers is performed from a system control microcomputer section, predetermined bytes of a plurality of control registers can be simultaneously accessed.

Therefore, the present invention is useful as a digital AV apparatus, such as a DTV (Digital Television), a DVD (Digital Versatile Disc), a DSC (Digital Still Camera), or the like.

What is claimed is:

1. A system control device comprising:
   a system LSI section having a plurality of functional blocks integrated on a single chip, each functional block having a control register of which a predetermined byte includes at least one of a startup bit used to start up the functional block and a status bit indicating status of the functional block;
   an address decoding section for decoding an access address to the predetermined byte in one of the control registers, and issuing an access control signal indicating all bytes of the one of the control registers;
   an access control section for changing the access control signal indicating said all bytes of the one of the registers to an access control signal indicating the predetermined bytes of the plurality of control registers included in the system LSI section;
   a system control microcomputer section for simultaneously accessing the bytes indicated by the access control signal; and
   an access mode control register for indicating whether or not the changing of the access control signal by the access control section is to be performed.

2. The system control device of claim 1, wherein the access control section changes the access control signal indicating said all bytes of the one of the control registers to an access control signal indicating an LSB (Least Significant Byte) of each of the plurality of control registers provided in the system LSI section.

3. The system control device of claim 2, further comprising:
   a byte position control section for changing a byte position indicated by the access control signal; and
   a byte position control register for storing information about the byte position changed by the byte position control section.

4. The system control device of claim 2, further comprising:
   an access mask control register section for masking an access control signal to each control register provided in the system LSI section in units of bits.

5. The system control device of claim 1, wherein the system LSI section is coupled to the access control section which is coupled to the address decoding section and the access mode control register, the address decoding section is coupled to the system control microcomputer which is coupled to the access mode control register.

6. A system control device comprising:
   a system LSI section having a plurality of functional blocks integrated on a single chip, each functional block having a control register of which a predetermined byte includes at least one of a startup bit used to start up the functional block and a status bit indicating status of the functional block;
   an address decoding section for decoding an access address to the predetermined byte in one of the control registers;
   an access control section for selecting and issuing either an access control signal indicating all bytes of the one of the control registers included in the system LSI section or an access control signal indicating the predetermined bytes of the plurality of control registers included in the system LSI section, based on the address decoded by the address decoding section; and
   a system control microcomputer section for simultaneously accessing the bytes indicated by the access control signal issued by the access control section.

7. The system control device of claim 6, further comprising:
   an access mask control register section for masking an access control signal to each control register provided in the system LSI section in units of bits.

8. The system control device of claim 6, wherein the system LSI section is coupled to the access control section which is coupled to the address decoding section, the address decoding section is coupled to the system control microcomputer.

9. A system control device comprising:
   a system LSI section having a plurality of functional blocks integrated on a single chip, each functional block having a control register which contains a value indicating an operation mode of the control register;
   an address decoding section for decoding an access address;
   an access control section for selecting and issuing either an access control signal indicating all bytes of one of the control registers included in the system LSI section or an access control signal indicating all bytes of a plurality of predetermined control registers of the plurality of control registers included in the system LSI section, based on the address decoded by the address decoding section; and
   a system control microcomputer section for simultaneously accessing the bytes indicated by the access control signal issued by the access control section.

10. The system control device of claim 9, further comprising:
    an access mask control register section for masking an access control signal to each control register provided in the system LSI section in units of bits.

11. The system control device of claim 9, wherein the system LSI section is coupled to the access control section which is coupled to the address decoding section, the address decoding section is coupled to the system control microcomputer.

* * * * *